US007697934B2

(12) United States Patent
Vikberg et al.

(10) Patent No.: US 7,697,934 B2
(45) Date of Patent: Apr. 13, 2010

(54) REGISTRATION OF A MOBILE STATION IN A MOBILE COMMUNICATIONS NETWORK

(75) Inventors: Jari Tapio Vikberg, Järna (SE); Tomas Nylander, Värmdö (SE); Håkan Niska, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 532 days.

(21) Appl. No.: 11/573,171

(22) PCT Filed: Jan. 25, 2005

(86) PCT No.: PCT/SE2005/000082

§ 371 (c)(1),
(2), (4) Date: Feb. 2, 2007

(87) PCT Pub. No.: WO2006/014128

PCT Pub. Date: Feb. 9, 2006

(65) Prior Publication Data

US 2008/0070574 A1    Mar. 20, 2008

(30) Foreign Application Priority Data

Aug. 2, 2004    (WO) ............... PCT/EP2004/008635

(51) Int. Cl.
*H04W 4/00*      (2009.01)
*H04W 84/02*     (2009.01)
*H04W 72/00*     (2009.01)

(52) U.S. Cl. .............. 455/435.2; 455/435.1; 455/435.3; 455/432.1; 455/433; 455/436

(58) Field of Classification Search .............. 455/435.1, 455/435.2, 435.3, 432.1–432.3, 436–444
See application file for complete search history.

(56) References Cited

U.S. PATENT DOCUMENTS 5,999,814 A * 12/1999 Cuffaro et al. ............... 455/436
6,453,176 B1 * 9/2002 Lopes et al. ............. 455/562.1
6,611,197 B1 * 8/2003 Ayerst et al. ............... 340/7.41

(Continued)

OTHER PUBLICATIONS

Siemens: "Summarized comments on the TR 43.901" 3GPP SA WG3: S3#35: T-DOC S3-040803, 'Online! Oct. 8, 2004, pp. 1-34, XP002326287 MALTA Retrieved from the Internet: URL:www.3gpp.org> 'retrieved on Apr. 26, 2005! chapter: Introduction, p. 5 5.1.1.2.2 Generic Access Network Controller, p. 8 5.1.2.1 Registration for Generic Access, pp. 9-10 5.1.2.2 Deregistration, p. 10 5.4.3 Re-Selection between GERAN/UTRAN and GAN modes, pp. 24-25.

*Primary Examiner*—Lun-Yi Lao
*Assistant Examiner*—Qun Shen

(57) ABSTRACT

The current invention relates to the registration of mobile stations in a mobile communications network. It has particular relevance to handovers and roaming between base stations of an unlicensed radio access network (110) and those of a conventional cellular network (120). As the cells in an unlicensed radio access network have a rather small size, it means that handover potentially can occur far more frequently than for a conventional cellular network. This can result in an undesired 'ping-pong' effect, i.e. that the mobile station is switching back and forth between two radio cells too frequently. The current invention reduces this effect by preventing the mobile station to register to the unlicensed radio access network during a modifiable period of time (306).

10 Claims, 6 Drawing Sheets

U.S. PATENT DOCUMENTS

| | | | |
|---|---|---|---|
| 6,690,659 B1* | 2/2004 | Ahmed et al. | 370/328 |
| 6,934,272 B2* | 8/2005 | Cheng et al. | 370/331 |
| 7,127,250 B2* | 10/2006 | Gallagher et al. | 455/436 |
| 7,155,222 B1* | 12/2006 | Jain et al. | 455/435.1 |
| 7,280,826 B2* | 10/2007 | Nylander et al. | 455/433 |
| 7,359,704 B1* | 4/2008 | Dizdarevic et al. | 455/435.1 |
| 7,362,731 B2* | 4/2008 | Vinayakray-Jani | 370/331 |
| 2004/0209593 A1* | 10/2004 | Alberth et al. | 455/403 |
| 2005/0037753 A1* | 2/2005 | Andersen et al. | 455/435.2 |
| 2007/0191054 A1* | 8/2007 | Das et al. | 455/525 |
| 2008/0070574 A1* | 3/2008 | Vikberg et al. | 455/435.2 |

* cited by examiner

| Registration occasion | Timer T1 values (secs) |
|---|---|
| 1 | 30 |
| 2 | 60 |
| 3 | 120 |
| 4 | 240 |
| 5 | 480 |
| n | 480 |

T2 value is set to 500 seconds

Figure 5

| Registration occasion | Timer T1 values (secs) |
|---|---|
| 1 | 30 |
| 2 | 30 |
| 3 | 30 |
| 4 | 60 |
| 5 | 90 |
| n | 240 |

T2 value is set to 250 seconds

Figure 6

REGISTRATION OF A MOBILE STATION IN A MOBILE COMMUNICATIONS NETWORK

TECHNICAL FIELD OF THE INVENTION

The current invention relates to the registration of mobile stations in a mobile communications network. It has particular relevance to handovers and roaming between base stations of an unlicensed radio access network and those of a conventional cellular network.

DESCRIPTION OF RELATED ART

Conventional (licensed) cellular networks may be extended by including access networks that utilize a low power unlicensed-radio interface to communicate with mobile stations. These access networks are designed to be used together with the core elements of a standard public mobile network. The access network is constructed so that the core elements, such as mobile switching centers MSC of the public mobile network views the unlicensed-radio access network as a conventional base station subsystem, BSS. A mobile access network of this kind and the mobile station for use with this access network is described in the European patent specification EP 1207708. The mobile access network consists of an access controller that connects to the core network and one or several low power access points. The access points are connected to the access controller via a broadband packet-switched network. The low power and resultant low range of the unlicensed-radio interface means that several such access networks may be provided in relatively close proximity. The use of an already existing broadband network to connect the access points and the access controller greatly facilitates the installation of the access network, permitting a subscriber to install the access network in his own home himself, for example. Suitable unlicensed-radio formats include digital enhanced cordless telecommunications (DECT), wireless LAN and Bluetooth. An adapted mobile station capable of operating over both the standard air interface (e.g. the Um interface) and the unlicensed-radio interface means that the subscriber requires only one phone for all environments.

A number of companies within the mobile telecom industry have jointly developed a set of open specifications for the unlicensed radio access network. Specifications of particular relevance are UMA Architecture (Stage 2) R1.0.0 and UMA Protocols (Stage 3) R1.0.0. (UMA=Unlicensed Mobile Access Network).

In unlicensed radio access networks it is the mobile station that initiates handover rather than the base station subsystem, BSS. This precludes the need to configure information on neighboring cells for each access point in the unlicensed radio access network.

A consequence of allowing the mobile station alone to control the handovers is that the network itself has little control and consequently is more vulnerable to frequent handovers.

In order to limit the signaling and processor load, conventional handover algorithms generally include some form of hysteresis, which prevents handover occurring too frequently. However, this is not entirely effective when unlicensed radio access networks are included in the mobile network, as the small size of the unlicensed radio frequency cells means that handover can potentially occur far more frequently. This can result in a 'ping-pong' effect, i.e. that the mobile station is switching back and forth between two radio cells too frequently. In the UMA specifications this problem has been addressed by introducing a time-supervision (an access network reselection timer TU3910) in the mobile station. When the mobile station leaves and de-registers from its associated unlicensed radio access, a timer is started in the mobile station. As long as the timer is running, the mobile station is expected not to return and register to the unlicensed radio access again, unless the mobile station has detected loss of coverage of the conventional cellular network. The value of the timer (which typically is fixed and predefined) is received by the mobile station in a register accept message from the access network controller (in the UMA specification also referred to as an UNC, UMA Network Controller). When the timer expires, the mobile station can register again if necessary.

SUMMARY OF THE INVENTION

The solution known from prior art is however far from sufficient. One problem is that handovers between two mobile communications access networks, of which one is an unlicensed radio access network, both connected to a conventional cellular network, is a rather new scenario and the experience of this is limited. As the unlicensed radio access cells are relatively small, it is expected that the probability of a 'ping-pong' effect between two different cells is significantly higher than in conventional cellular networks.

To choose a proper value of the access network reselection timer is difficult. A too small value does not significantly reduce the 'ping-pong' effect and a too large value limits the use of the unlicensed radio access network.

Another problem is that a mobile context stored in the access network controller is erased each time the mobile station de-registers. The context of a mobile station is the information required to identify and locate the mobile station. Having this limitation, the unlicensed radio access network cannot keep any history about the mobile station's behavior. Without this history, it is not possible for the access network controller to detect and act upon an undesired or an unexpected high frequency of handovers and location updates.

The present invention improves the known solution by keeping the mobile context alive during a certain time (a context keep-alive time) after the mobile station de-registers from the unlicensed access network. A further improvement is achieved by allowing the access network controller to modify the value of the access network reselection timer when the mobile station registers again.

Somewhat more in detail, when a mobile station registers to the unlicensed radio access network for the first time, the context is created and an initial value of the access network reselection timer is set in the access network controller. This value is sent to the mobile station in a register accept message. When the mobile station de-registers, the context is kept and a time supervision is started in the access network controller, a context keep-alive timer. The value of the context keep-alive timer is always larger than the value of the access network reselection timer. If the mobile station has not registered again when the context keep-alive timer expires, the context is erased in the access network controller. If the mobile station registers again when the context still exists, the access network controller will stop the context keep-alive timer. According to the further improvement the access network controller will set a new value (e.g. a larger value) of the access network reselection timer. This new timer value is sent to the mobile station in the register accept message in the same way as for the initial value.

The inventive concept works both for registrations in active mode (i.e. for handover) and in idle mode (i.e. in roaming and location update situations).

The objective of the current invention is therefore to reduce the frequency of handovers and location updates between different networks and thereby reducing signaling and processing load in the involved network elements.

The main advantage of the invention is that the access network controller can keep a history and act upon an undesirable high frequency of registrations and de-registrations. By modifying the time period when the mobile station is not allowed to register, the 'ping-pong' effect between cells can be further reduced.

Another advantage is that the invention is compatible with existing unlicensed radio interfaces as the mobile station stores and acts upon the received value of the access network reselection timer received from the access network controller as before.

The invention will now be described in more detail and with preferred embodiments and referring to accompanying drawings.

BRIEF DESCRIPTION OF THE DRAWINGS

FIGS. 5 and 6 are tables that describe some examples of different schemes of access network reselection timers that can be used in the registration procedure.

DETAILED DESCRIPTION OF EMBODIMENTS

Figure 1:
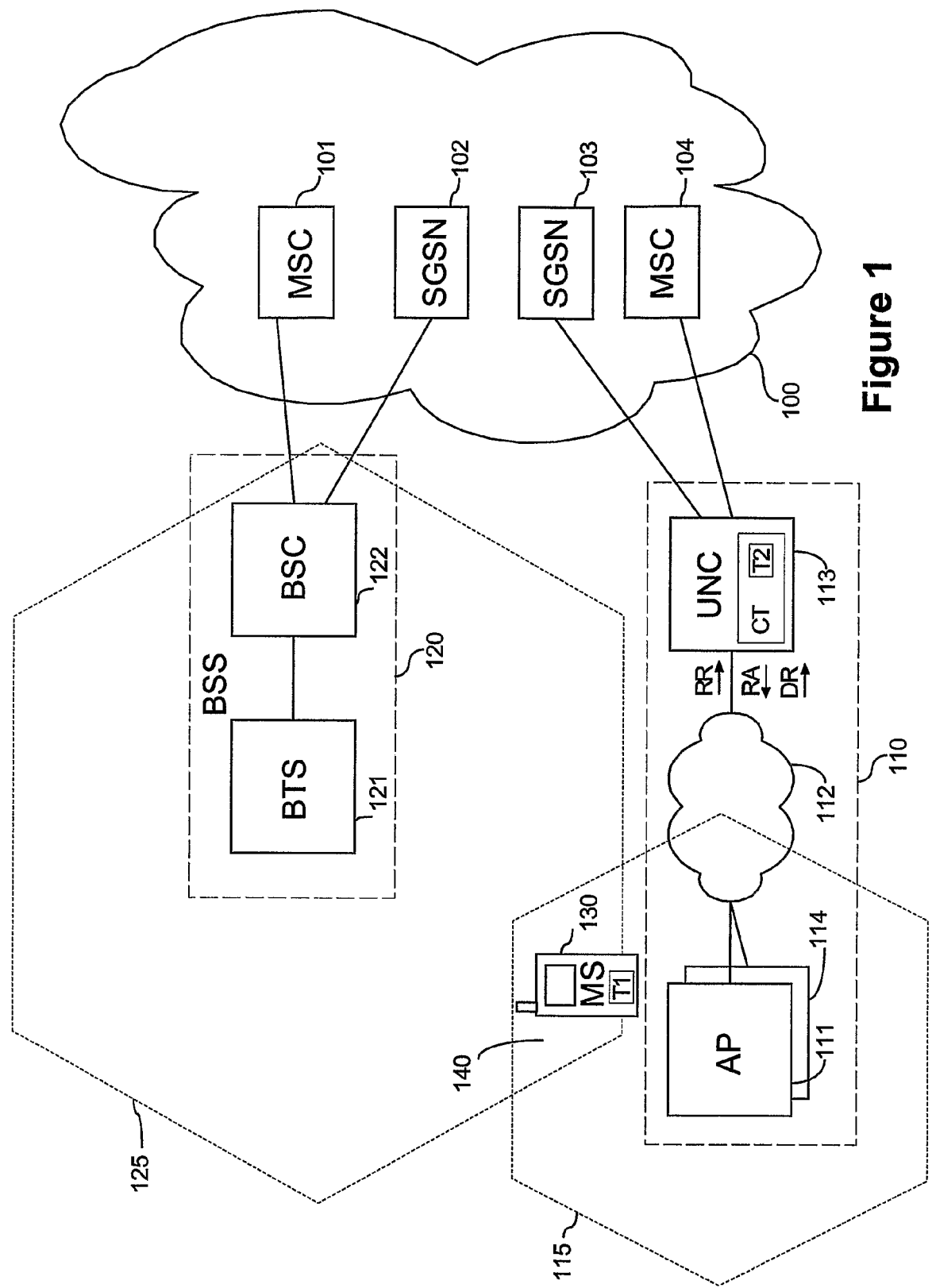
FIG. 1 is a block diagram that describes a mobile communications network involving network elements from an unlicensed radio access network and a conventional cellular network including a conventional radio access network.

The block diagram in FIG. 1 schematically depicts the network elements of two mobile communication networks of which one is a conventional mobile telecommunication network 100, 120 and the other is an unlicensed radio access network 110.

The conventional (licensed) mobile telecommunications network (such as a GSM network) is divided into a core network portion 100 and a conventional access network portion 120. The access network portion 120 is connected to an MSC (Mobile Switching Center) 101 and a SGSN (Serving GPRS Support Node) 102 in the core network portion 100. The access network portion 120 is also called BSS, Base Station System and is divided into two entities, a BSC, Base Station Controller 122 and a BTS, Base Transceiver System 121.

The unlicensed radio access network 110 is connected to a MSC 104 and a SGSN 103 in the core network portion 100 in the same manner as for the BSS 120. The MSC 101 and the MSC 104 could either be different MSC's or be one and the same as well as SGSN 102 and SGSN 103 could be either different SGSN's or one and the same.

The unlicensed radio access network 110 is further divided into an Access Network Controller (or using the UMA standard term UNC, UMA Network Controller) 113, a broadband network 112 and one or several AP, Access Points 111, 114.

The Access Network Controller 113 appears to the core network portion 100 as if it is a BSS in the same way as BSS 120.

The Access Point 111 provides the radio link to a Mobile Station 130 using an unlicensed radio spectrum. The radio link could use for example technologies such as DECT, Bluetooth or Wireless LAN's (IEEE 802.11 etc.).

The broadband network 112 provides connectivity between the Access Network Controller 113 and the Access Point 111 and can be based on for example IP, ATM or other broadband technologies.

The Mobile Station 130 includes a multi-mode radio supporting for example both a conventional cellular radio spectrum and an unlicensed radio spectrum. The Mobile Station 130 has the capability to switch between the BTS 121 and the Access Point 111.

The radio coverage of a transceiver in a mobile network is also known as a cell. A cell 125 illustrates the radio coverage of the transceiver in BTS 121 and a cell 115 illustrates the radio coverage of the transceiver in the Access Point 111.

The current invention relates to the situation when the Mobile Station 130 is roaming inside or in close proximity to an area 140, which is covered by both cells 115 and 125.

Figure 2:
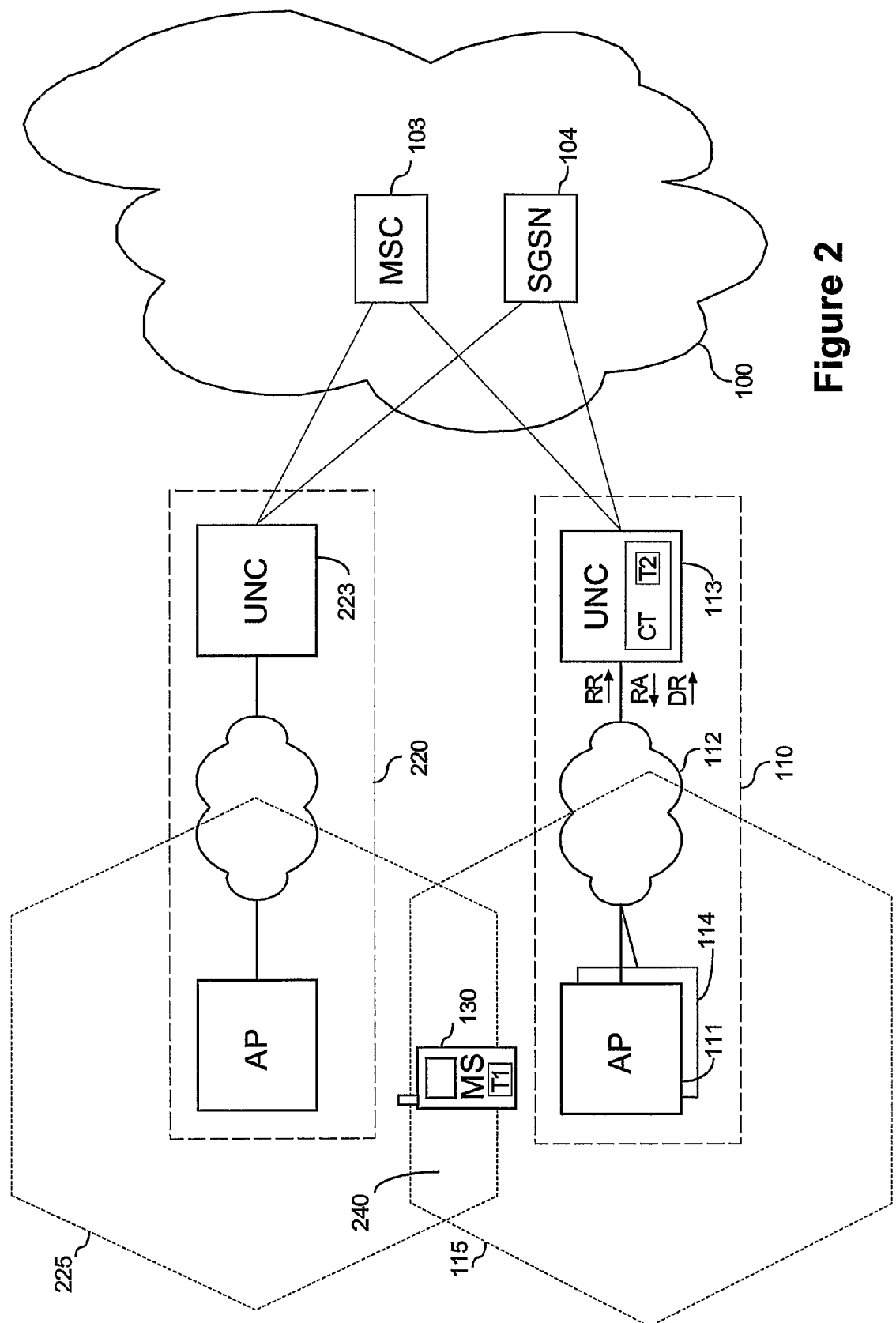
FIG. 2 is a block diagram that describes a mobile communications network involving network elements from two unlicensed radio access networks.

The invention is also applicable to a situation involving a plurality of different unlicensed radio access networks. In FIG. 2 the Mobile Station 130 is roaming around in or close to an area 240, which is covered by the cell 115 and a cell 225. The latter belonging to an unlicensed radio access network 220. The two unlicensed radio access networks are here connected to the same MSC 103 and SGSN 104 but this is not a necessary requirement for the implementation of the invention.

Common for both situations is that when the Mobile Station 130 registers to the unlicensed radio access network 110, it sends a Register Request message RR to the Access Network Controller 113. If not already created, the Access Network Controller 113 creates a mobile context CT and sends a Register Accept message RA to the Mobile Station 130. The Register Accept message RA includes among others a value of an Access Network Reselection Timer T1 that will be stored in the Mobile Station 130. When the Mobile Station 130 de-registers from the unlicensed radio access network 110, it sends a Deregister message DR to the Access Network Controller 113. In the latter is stored a value of a Context Keep-alive Timer T2, the function of which will be explained below.

Figure 3:
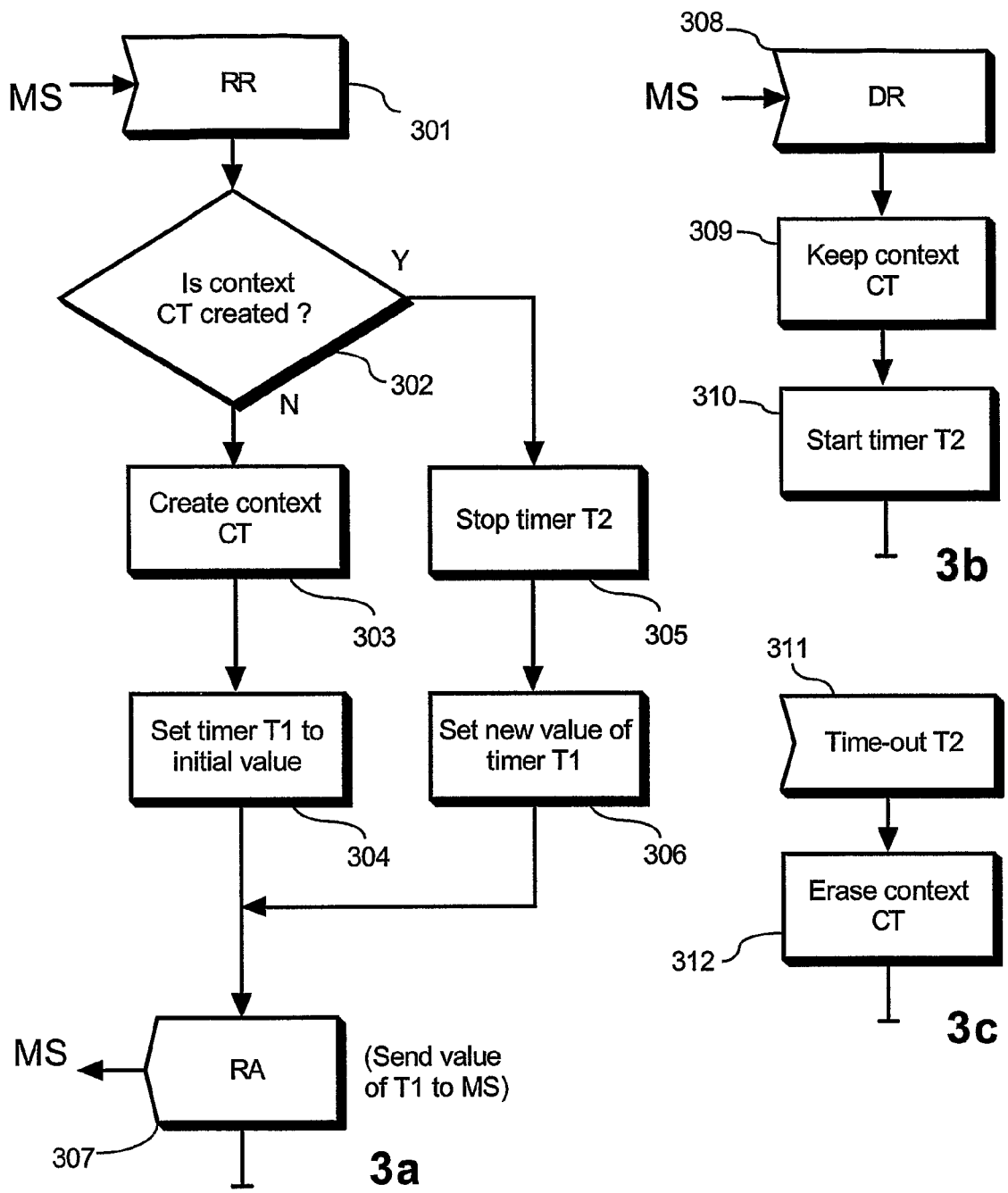
FIG. 3 is a flow chart that describes the registration procedure for a mobile station in an unlicensed access network according to the inventive concept.

A method for registering the mobile station 130 according to an embodiment of the current invention is described in connection with FIGS. 3a,b,c. In FIG. 3a, the Access Network Controller 113 receives the Register Request message RR from the Mobile Station 130 in a step 301. In a step 302 a check is done if the context CT is already created within the Access Network Controller 113. If not, in an alternative N, the context CT is created in a step 303. The Access Network Controller 113 does also set an initial value of the Access Network Reselection Timer T1, step 304, and sends in a step 307 the value to the Mobile Station 130 in the Register Accept message RA. When applying the invention in relation to the UMA specifications, timer T1 can correspond to timer TU3910.

When, in FIG. 3b, the Mobile Station 130 deregisters (message DR) in a step 308 from the Access Network Controller 113, the context CT is kept in a step 309 and the Context Keep-alive timer T2 is started in a step 310 in the Access Network Controller 113.

If, in FIG. 3a, the context CT already was created when the Mobile Station 130 registers in the step 301, the Access Network Controller 113 stops the Context Keep-alive Timer T2 in a step 305 and sets in a step 306 a new value of the Access Network Reselection Timer T1. This new value is sent to the Mobile Station 130 in the Register Accept message RA in the step 307.

If, in FIG. 3c, the Mobile Station 130 has deregistered from the Access Network Controller 113 and does not register again before the Context Keep-alive Timer T2 expires, step 311, the context CT in the Access Network Controller 113 is erased in a step 312. At this stage the procedure described above will start all over again when the Mobile Station 130 registers in the step 301.

The values of the Access Network Reselection Timer T1 and the Context Keep-alive Timer T2 can be used according to a specific scheme. In a simplified embodiment the value of the Access Network Reselection Timer T1 can for example be incremented each time the Mobile Station 130 registers to the unlicensed radio access networks. This can be implemented in the Access Network Controller 113 by using a counter variable. This counter variable is incremented with a fixed value for each registration occasion and the value of the Access Network Reselection Timer T1 is set to this incremented value.

However in a more flexible embodiment the timer values are set according to a scheme that consist of one or several tables with timer values stored in the Access Network Controller 113. These tables are further detailed and explained in FIGS. 5 and 6. Common to both embodiments is that the value of the Access Network Reselection Timer T1 always is smaller than the value of the Keep-alive Timer T2.

The registration procedure described above does allow for a situation where one and the same mobile station has a plurality of simultaneous contexts in different network access controllers. Referring to FIG. 2, the same Mobile Station 130 could for example have simultaneous contexts in both the Access Controller 113 and in an Access Controller 223.

In FIG. 1 and FIG. 2, it is also possible that several Access Points 111, 114 are connected to the same Access Network Controller 113. In this case each Access Point 111, 114 is covering its own unique cell. The handover between these cells is done on a lower layer of the radio interface and does not interfere with the registration procedure described in the current invention. The Access Network Controller 113 is however informed by the Mobile Station 130 when it changes Access Point 111, 114.

Figure 4:
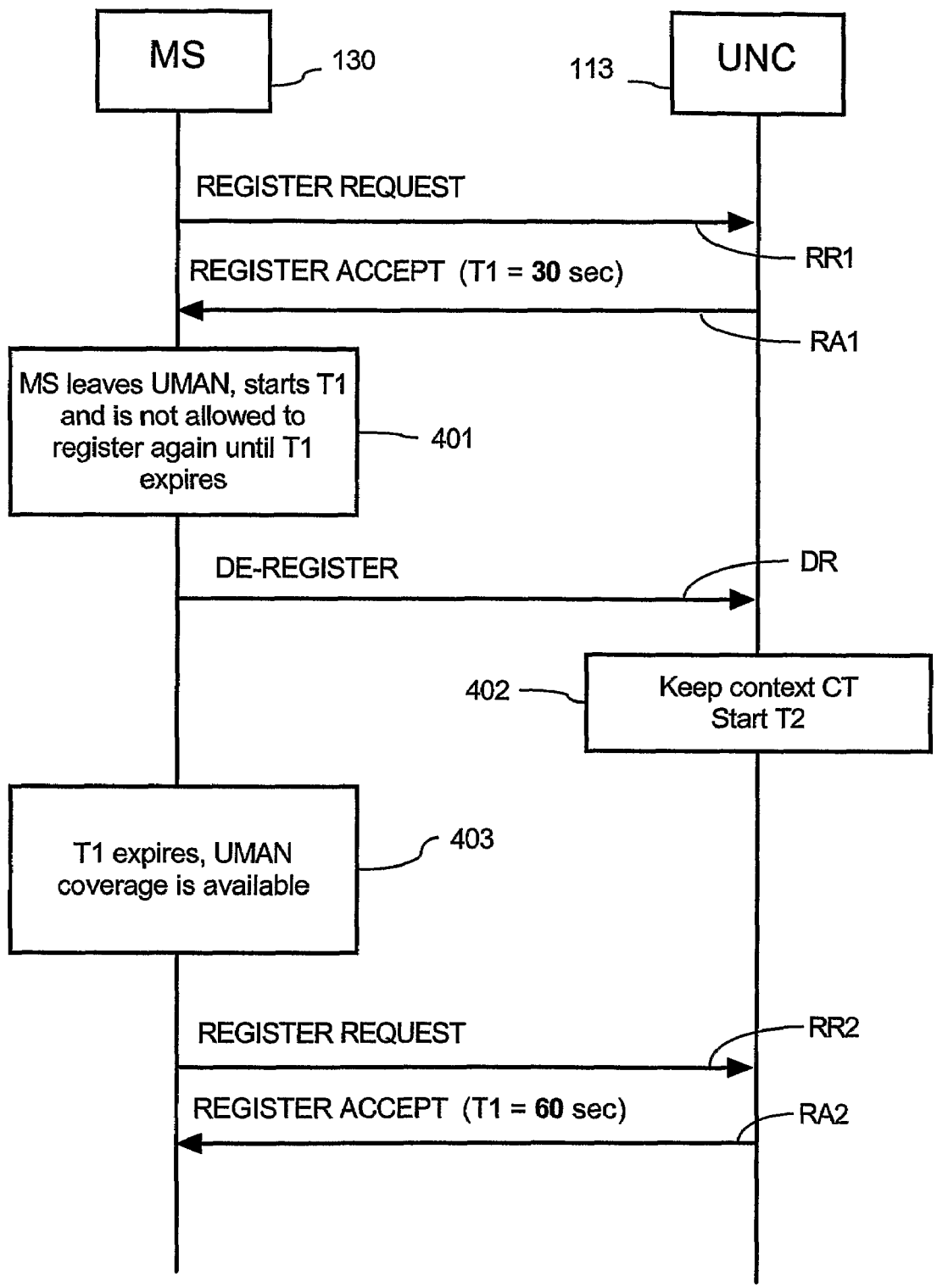
FIG. 4 is a block diagram that describes the involved network elements and the relevant information flow between these network elements in one embodiment of the invention.

FIG. 4 describes a sample of the information flow between the Mobile Station 130 and the Access Network Controller (UNC) 113. When the Mobile Station 130 determines that it should register to the unlicensed mobile access network, it sends a Register Request message RR1 to the Access Network Controller 113. Assuming that no context CT is created, the Access Network Controller 113 creates such a context CT and sends an initial value (30 seconds) of the Access Network Reselection Timer T1 in a Register Accept message RA1 to the Mobile Station 130. When the Mobile Station 130 determines in a step 401 that it should leave the unlicensed mobile access network, it sends a De-register message DR to the Access Network Controller 113. In step 402 the Access Network Controller 113 keeps the context CT and starts a Context Keep-alive Timer T2. The Mobile Station 130 will not be allowed to register again until, in a step 403, the Access Network Reselection Timer T1 expires. When the Mobile Station 130 again determines that it should register to the unlicensed mobile access network it sends a new Register Request message RR2 to the Access Network Controller 113. As the context CT still exists, the Access Network Controller 113 will send a new value (60 seconds) of the Access Network Reselection Timer T1 in a Register Accept message RA2 to the Mobile Station 130.

An arbitrary number of different schemes for setting the Access Network Reselection Timer T1 and the Keep-alive Timer T2 are possible and two examples are found in the tables in FIGS. 5 and 6 respectively. For each registration occasion 501, there is a corresponding timer value 502, and for each registration occasion 601 there is a corresponding timer value 602. In order to point out the right timer value for each registration occasion, a corresponding counter is implemented in the Access Network Controller 113. The counter is incremented at each new registration occasion 501, 601.

In FIG. 5, the Keep-alive Timer T2 is set to 500 seconds and the initial value of the Access Network Reselection Timer T1 is set to 30 seconds. For each new registration occasion while the context exists, each subsequent timer value is increased proportionally by multiplying the previous value by two until it reaches the value 480 seconds.

In FIG. 6 it is assumed that the Keep-alive Timer T2 is set to 250 seconds. The initial timer value of the Access Network Reselection Timer T1 is set to 30 seconds. For the two subsequent registration occasions the timer values are still set to 30 seconds but for each following registration occasion, the timer value is incremented by 30 seconds until it reaches the value 240 seconds.

By using these flexible schemes, the 'ping-pong' effect between different cells can be further reduced as the schemes can be modified in order to 'tune in' the timer values to fit different installations. Each Access Network Controller 113 could have individual schemes for that particular Access Network Controller if necessary. It also possible that the Access Network Controller 113 stores several schemes, each coupled to the cell the mobile station last visited or coupled to the Access Point that is currently used. The UMA specification includes that the identity of these cells and Access Points are communicated from the Mobile Station 130 to the Access Network Controller 113 in the registration procedure.

When setting the timer values in the schemes it is again important that the value of the Access Network Reselection Timer T1 always is set a value smaller than the value of the Keep-alive Timer T2. It may also be necessary to take into account other timers used in the unlicensed radio access network (110) not mentioned here.

Figure 7:
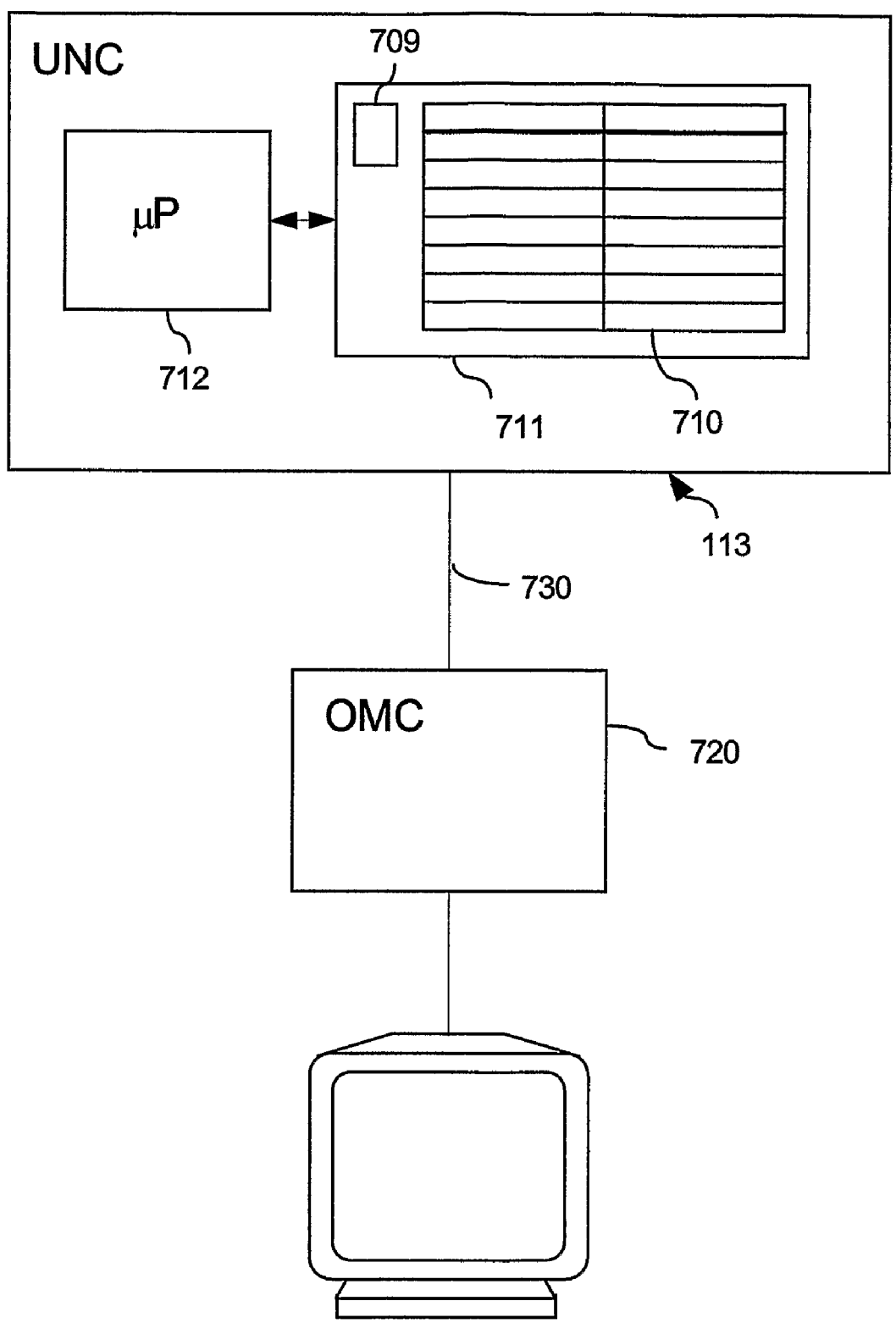
FIG. 7 is a block diagram that describes an embodiment of how the different schemes of timers are implemented in the access controller.

In one embodiment of the invention the schemes can be set and modified from an operation and maintenance center OMC. FIG. 7 is a block diagram describing the Access Network Controller 113, a network management interface 730 and an Operation and Maintenance Center 720. The Access Network Controller 113 is connected to the Operation and Maintenance Center 720 through the network management interface 730. In the Access Network Controller 113 a scheme 710 of values of the Access Network Reselection Timer T1 and the Keep-alive Timer T2 are stored in a memory area 711. For each scheme 710 there is also a corresponding counter variable 709 stored in the memory area 711. The counter variable 709 is used to point out the position of the current value of Access Reselection Timer T1 and is incremented at each new registration occasion. The memory area 711 is further accessible by a processor 712. From the Operation and Maintenance Center 720 it is possible access the processor 712 and memory area 711 and thereby it is possible to set and modify the content of the memory area 711 including the scheme 710.

The invention claimed is:

1. A method of registering a mobile station in a telecommunication network having a core network portion of a licensed mobile communication network and at least two mobile communication access networks, at least one of which is an unlicensed radio access network, said method comprising the steps of:

receiving by an access network controller in the unlicensed radio access network, a registration request message from the mobile station, wherein the registration request message is received via an access point utilizing an unlicensed radio interface;

creating a mobile context for the mobile station;

setting a value of an access reselection timer, wherein the mobile station is prevented from registering with the unlicensed radio access network before the access reselection timer expires;

sending the value of the access reselection timer to the mobile station in a registration accept message;

receiving a de-registration message from the mobile station;

starting a context keep-alive timer, wherein a value of the context keep-alive timer is greater than the value of the access reselection timer;

receiving by the access network controller another registration request message from the mobile station;

noting that the mobile context already is created;

stopping the context keep-alive timer;

resetting the value of the access reselection timer; and sending the reset value of the access reselection timer to the mobile station in a second registration accept message.

2. The method as recited in claim 1, wherein the mobile context is erased when the context keep-alive timer expires.

3. The method as recited in claim 1, wherein the mobile communication access networks are both unlicensed radio access networks.

4. The method as recited in claim 1, wherein the reset value of the access reselection timer is set by incrementing the value first set.

5. The method as recited in claim 1, wherein the value of the access reselection timer is set and reset according to a scheme of timer values.

6. An access network controller in an unlicensed radio access network for controlling access to the unlicensed radio access network by mobile stations, the access network controller being in communication with a core network portion of a licensed mobile communication network and with at least one access point in the unlicensed radio access network, the access network controller comprising:

a processor;

a memory area accessible by the processor, the memory area containing values of an access reselection timer, a value of a context keep-alive timer, and at least one counter variable; and communication means for receiving a registration request message from a mobile station via an access point utilizing an unlicensed radio interface;

means for creating a mobile context for the mobile station in response to receiving the registration request message;

means for setting a value of the access reselection timer;

communication means for sending the value of the access reselection timer to the mobile station in a registration accept message;

communication means for receiving a de-registration message from the mobile station;

means for starting the context keep-alive timer, wherein the value of the context keep-alive timer is greater than the value of the access reselection timer;

communication means for receiving a second registration request message from the mobile station;

means for noting that the mobile context is already created;

means for stopping the context keep-alive timer;

means for resetting the value of the access reselection timer; and means for sending the reset value of the access reselection timer to the mobile station in a second registration accept message.

7. The access network controller as recited in claim 6, wherein the values of the access reselection timer and the value of the context keep-alive timer are alterable according to or predefined schemes.

8. The access network controller as recited in claim 6, further comprising a network management interface for communicating between the access network controller and an operation and maintenance center.

9. The access network controller as recited in claim 8, wherein the values of the access reselection timer and the value of the context keep-alive timer are alterable by the operation and maintenance center via the network management interface.

10. The access network controller as recited in claim 6, wherein the counter variable points out the position of a current value of the access reselection timer in the memory area.

* * * * *

UNITED STATES PATENT AND TRADEMARK OFFICE
CERTIFICATE OF CORRECTION

PATENT NO. : 7,697,934 B2 Page 1 of 1
APPLICATION NO. : 11/573171
DATED : April 13, 2010
INVENTOR(S) : Vikberg et al.

It is certified that error appears in the above-identified patent and that said Letters Patent is hereby corrected as shown below:

In Column 8, Line 35, in Claim 7, after "to" delete "or".

Signed and Sealed this

Fifteenth Day of June, 2010

David J. Kappos
*Director of the United States Patent and Trademark Office*